United States Patent
Cottrell et al.

(10) Patent No.: US 6,916,073 B2
(45) Date of Patent: Jul. 12, 2005

(54) PNEUMATIC TIRE AND WHEEL ALLOWING UNASSISTED MANUAL MOUNTING OF THE TIRE AND A METHOD FOR DESIGNING SUCH A TIRE AND WHEEL

(75) Inventors: Roger C. Cottrell, Simpsonville, SC (US); Ronald H. Thompson, Greenville, SC (US)

(73) Assignee: Michelin Recherche et Technique, Granges-Paccot (CH)

( * ) Notice: Subject to any disclaimer, the term of this patent is extended or adjusted under 35 U.S.C. 154(b) by 0 days.

(21) Appl. No.: 10/796,665

(22) Filed: Mar. 8, 2004

(65) Prior Publication Data

US 2004/0169412 A1 Sep. 2, 2004

Related U.S. Application Data

(63) Continuation of application No. PCT/US01/28640, filed on Sep. 12, 2001.

(51) Int. Cl.$^7$ .............................................. B60B 21/00
(52) U.S. Cl. ............................. 301/95.109; 152/379.3; 157/1.17
(58) Field of Search ........................... 152/381.3, 381.4, 152/379.4, 381.5, 381.6, 379.3; 157/1.17, 1.1; 301/95.109, 95.101, 111.07, 10.1, 37.36, 379.3

(56) References Cited

U.S. PATENT DOCUMENTS

| | | | |
|---|---|---|---|
| 737,745 A | * 9/1903 | Kronenberg | 152/411 |
| 4,042,003 A | * 8/1977 | Gaskill et al. | 152/381.4 |
| 4,274,465 A | * 6/1981 | Allbert et al. | 152/379.5 |
| 4,606,390 A | * 8/1986 | Shute | 152/381.4 |
| 4,836,260 A | * 6/1989 | Corner et al. | 152/375 |
| 4,976,141 A | * 12/1990 | Cargould et al. | 73/146 |
| 5,361,493 A | * 11/1994 | Baldi | 29/894.324 |
| 5,429,422 A | * 7/1995 | Baldi | 301/65 |
| 6,415,839 B1 | * 7/2002 | Pompier et al. | 152/381.4 |
| 6,457,501 B1 | * 10/2002 | Ball | 152/379.3 |

* cited by examiner

*Primary Examiner*—Frantz F. Jules
(74) *Attorney, Agent, or Firm*—E. Martin Remick

(57) ABSTRACT

A tire and wheel assembly that permits hand-mounting of the tire on the wheel is provided. The following parameters are identified in a specific relationship so as to provide a tire that permits such hand mounting: $C_t$ is the circumference of the wheel well, from the mounting side flange, H is the radial height of the rim flange, and Y is the axial width of the rim flange, and M represents an amount of additional length, preferably about 80 millimeters.

4 Claims, 2 Drawing Sheets

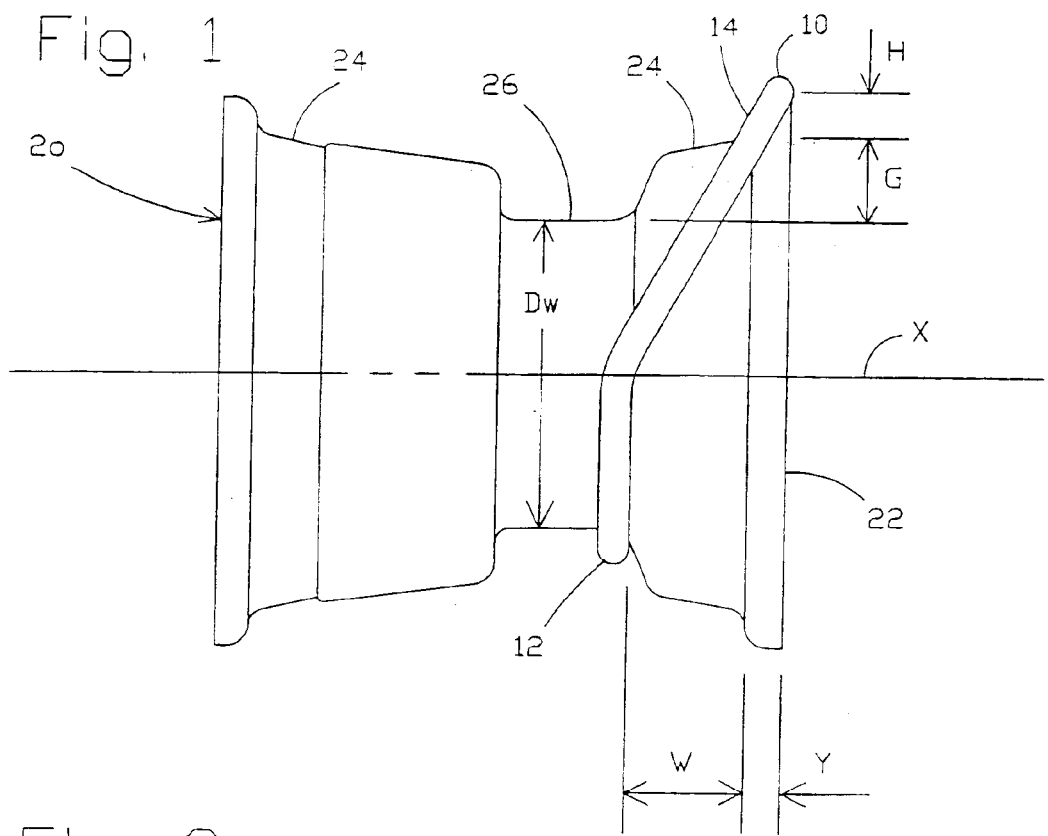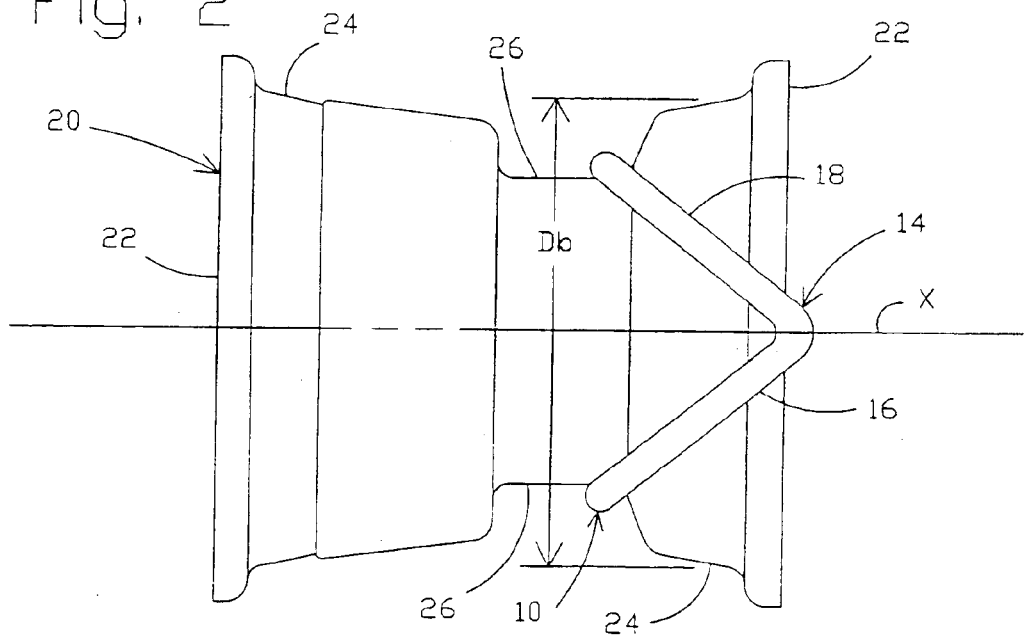

PNEUMATIC TIRE AND WHEEL ALLOWING UNASSISTED MANUAL MOUNTING OF THE TIRE AND A METHOD FOR DESIGNING SUCH A TIRE AND WHEEL

This is a continuation of PCT/US 01/28640 filed Sep. 12, 2001.

BACKGROUND AND SUMMARY OF THE INVENTION

The invention relates to tubeless pneumatic tires and wheels, and more specifically, to a wheel configured to allow hand mounting of a tubeless pneumatic tire on the wheel without the assistance of tools.

Tubeless pneumatic tire and wheel assemblies form a chamber that retains air without a separate air-holding tube. Tension of the tire beads on the wheel bead seats forms an air-tight seal. Internal air pressure acts axially outward to push the tire bead against the wheel rim flange. The rim flange, which extends radially outward from the bead seat, prevents the tire bead from coming off the wheel.

In mounting pneumatic tire on a wheel, typically, one bead is entirely passed relatively easily over the rim flange. Mounting the other bead is assisted by the wheel well, which allows a portion of the bead to slip over the flange, but requires the application of force to move the remaining portion of the bead over the flange. This step requires tools and typically requires a machine because the tire bead must be deformed from a circular shape and stretched to pass over the rim flange.

The present invention is directed to a pneumatic tire and wheel having geometries specifically adapted to allow the tire to be mounted on the wheel by hand without the use of tools or machines.

More particularly, the present invention is directed to a wheel having a rim flange of a height and having a well with a depth relative to the rim flange height and at a location relative to the rim flange that permits a tire bead to pass over the rim flange with manually-generated forces.

According to the invention, for a tire having a bead seat circumference $C_t$, the wheel geometry is defined by:

$$C_t = \frac{1}{2}\pi D_w + 2\sqrt{\frac{1}{2}D_w^2 + D_w(G+H) + (G+H)^2 + (W+Y)^2} + M$$

where $D_w$ is the wheel well diameter, G is the depth of the wheel well measured from the wheel bead seat, W is a axial distance from the edge of the wheel well to the mounting side flange, H is the radial height of the rim flange above the wheel bead seat, Y is the axial width of the rim flange, and M represents a quantity of extra length needed to enable hand-mounting, the units of measure being millimeters.

Preferably, the tire has beads that have an ovalization stiffness, that is the ability to resist being deformed from a circular shape to an oval shape, of not more than about 0.7 N/mm.

In addition, it may be necessary to modify the tire and/or the wheel to ensure an appropriate balance between the internal pressure of the tire and axial resistance force provided by the rim flange. A method for checking the relative forces could include the following steps. Once the rim flange height H is determined from the above relationship, the stress on the rim flange and the axially outward acting force generated by internal tire pressure may be approximately related by the following equations:

$$F = \pi P\left(\left(\frac{D_{eq}}{2}\right)^2 - \left(\frac{D_b}{2}\right)^2\right)$$

where, F is the axially outward acting force on the tire rim flange, $D_{eq}$ is the equilibrium diameter of the tire, $D_b$ is tire bead diameter, and P is the inflation pressure, and $$F \approx \sigma \pi D_b H$$

where, σ is the stress on the tire rim flange and H is the height of the rim flange as determined from the wheel geometry equation.

To arrive at the appropriate balance of forces, the rim flange of the wheel could be reinforced to improve the handling of stresses. Alternatively, the tire could be modified, for example, the internal pressure specification P could be lowered, or the tire equilibrium diameter could be changed by reducing the aspect ratio of the tire, that is, using shorter sidewalls.

BRIEF DESCRIPTION OF THE DRAWINGS

The invention will be better understood by reference to the following Detailed Description in conjunction with the appended figures, in which:

FIG. 1 is a side view illustrating a flexible ring being slipped over a rim flange of a wheel;

FIG. 2 is view of the ring and wheel of FIG. 1 with the wheel rotated 90° about its axis of rotation; and, FIG. 3 is a sectional view of a tire bead and rim illustrating schematically the forces at the bead seat and rim flange.

DETAILED DESCRIPTION

Figure 3:
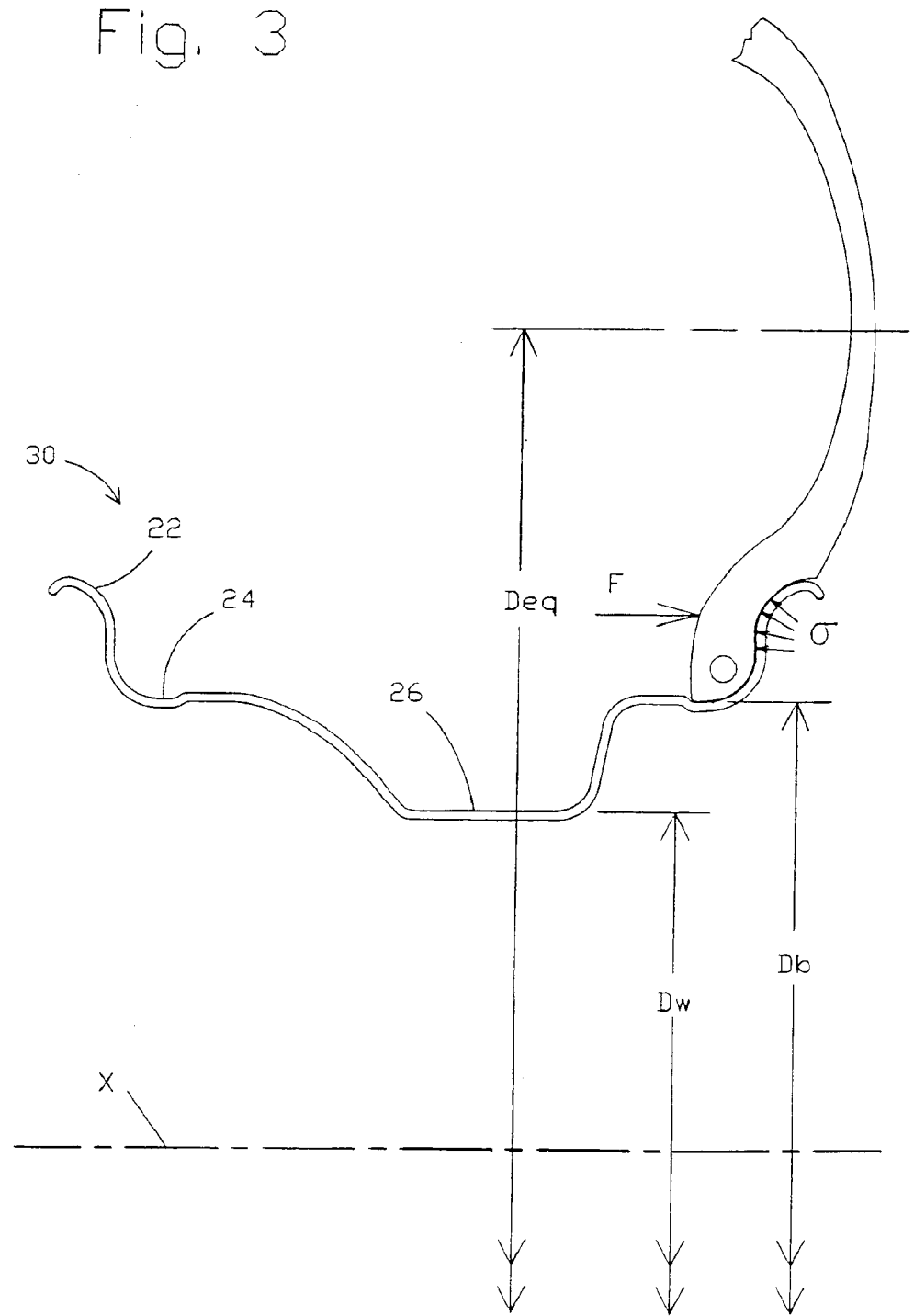

The invention relates to mounting tubeless, pneumatic tires onto wheels without the assistance of tools or machines. To illustrate the principles of the invention, FIG. 1 shows a side view of a wheel 20 with a flexible ring 10 illustrated as if passing over the rim flange 22 onto the wheel, which approximates the path over which a tire bead follows when mounted on a wheel of the drop center or well type. The following description and the appended drawings are intended to describe and illustrate the principles of the invention by way of embodiments, and the invention should not be construed as being limited to the particular embodiments.

A tubeless, pneumatic tire mounted on a wheel, such as the wheel 20 in FIG. 1, will sit with its beads on the bead seats 14 and abutting the rim flange 22. The bead of a tire (not illustrated in FIG. 1) comprises a bead wire or cable, which engages the carcass plies, surrounded by various rubber products which perform different functions. The rubber product under the bead wire, that is, radially inward of the bead wire, is compressed against the bead seat when the tire is mounted to form an airtight seal. The tire bead is retained on the wheel by the opposing actions of the internal tire air pressure and the rim flange and the typically frusto-conical bead seat.

The rim flange 22 poses difficulties in mounting the tire because the tire bead, which is a smaller diameter than the rim flange 22, must be deformed and/or stretched to pass over the flange 22 on to the wheel 20. The wheel well 26 provides some assistance by shortening the path between the outer edge of the flange 24 and the wheel inner surface. Nonetheless, in conventional tubeless, pneumatic wheels, mounting a tire requires tools and/or a machine to perform the necessary deformation of the tire bead.

The inventors have discovered that by modeling the movement of the tire bead over the rim flange, the relationships among the various dimensions of the wheel to the bead diameter can be established such that a pneumatic, tubeless tire and wheel combination can be designed to permit hand mounting of the tire on the wheel. FIGS. 1 and 2 show a rim profile with dimensions of interest identified: the rim flange width Y, the axial distance from the rim flange to the wheel well W, the height H of the rim flange above the bead seat 24, the depth G of the wheel well relative the bead seat 24, the wheel well diameter $D_w$, and the bead seat diameter $D_b$. The axis of rotation X of the wheel is also shown. The point determining the bead seat diameter is the axial midpoint of the seat.

Fitting a tire bead over a rim flange 22 can be approximated, as represented in FIGS. 1 and 2, by a ring 10 having a semi-circular portion 12 positioned on the wheel well 26 with a triangular portion 14 deformed to stretch over the rim flange 22. Note that each of the legs 16, 18 of the triangular portion 14 extends radially outward from the wheel well 26 to a point on the outer edge of the rim flange 22 and axially outward on a plane including the axis of rotation X of the wheel. The length C of the ring 10 needed to form this shape (and accordingly fit over the rim flange) is approximated as the sum of the length of the semi-circular portion 12 (half the circumference of the wheel well 26) plus the total length 2L of the two legs 16, 18 of the triangular portion 14:

$$C = \frac{1}{2}\pi D_w + 2L$$

The length of each leg 16, 18 may be calculated by treating each leg as the hypotenuse of a triangle formed by the leg 16 or 18, the radius of the rim flange (½$D_w$+G+H) (see FIG. 1), and a projection of the leg 16, 18 onto the wheel axial plane. As an expression, the length L of a leg may be written as:

$$L = \sqrt{\left(\frac{1}{2}D_w + G + H\right)^2 + p^2}$$

where p is the length of the projection of the leg of the triangular portion 14.

The length of the projection p of the leg may be calculated by treating it as the hypotenuse of a triangle formed by the projection p, the radius of the wheel well (½$D_w$), and the axial distance W+Y from the outer edge of the rim flange 22 to wheel well 26, or:

$$p^2 = \left(\frac{1}{2}D_w\right)^2 + (W+Y)^2$$

Thus, the length of the two legs of the triangular portion 14 may be expressed as:

$$2L = 2\sqrt{\left(\frac{1}{2}D_w + G + H\right)^2 + \left(\frac{1}{2}D_w\right)^2 + (W+Y)^2}$$

which, after expanding the first term and collecting identical quantities, becomes:

$$2L = 2\sqrt{\frac{1}{2}D_w^2 + D_w(G+H) + (G+H)^2 + (W+Y)^2}$$

Summing the length of the semicircular portion 12 and the lengths of the two triangular portions produces an approximation of the minimum length of bead circumference needed to pass over the rim flange. However, this length would not necessarily produce a hand-mountable bead. The inventors have discovered that the tire bead circumference must be extended an additional length to enable hand-mounting of the tire. According to the invention, therefore, for a tire having a bead seat circumference $C_b$, the wheel geometry is defined by:

$$C_t = \frac{1}{2}\pi D_w + 2\sqrt{\frac{1}{2}D_w^2 + D_w(G+H) + (G+H)^2 + (W+Y)^2} + M$$

where the units of measure are millimeters and M represents a quantity of extra length needed to enable hand-mounting.

According to the invention, a preferred value of M to enable hand-mounting is 80 millimeters. The extra length M is related to the wheel diameter and the stiffness of the tire bead (explained in more detail below), and can range from 75 to 100 mm. Of course, the amount of length added to the tire bead circumference should not be so much that the tire fails to form a seal on the bead seat or does not remain seated on the rim.

Preferably, for hand mounting, the tire has beads having an ovalization stiffness, that is the ability to resist deforming under force from a circular shape to an oval shape, of not more than about 0.7 N/mm. Stiffer beads would not be readily deformable by hand for passing over the rim flange.

The amount of additional length M may be affected by the ovalization stiffness of the tire bead and a more easily deformable bead could require less than 80 mm additional length, while a less easily deformable bead may require more than 80 mm.

The equation for the length of the bead circumference suggests that a deeper wheel well and/or a lower rim flange height produces a wheel on which a tire is more readily hand-mountable. Of course, there are practical limits on the depth of the wheel well, so not to interfere with the necessary wheel mounting hub diameter, and on the rim flange height, to ensure that the tire is retained on the rim.

To ensure that the tire rim can withstand the internal pressure force of the tire, it may be necessary to modify the tire and/or the wheel rim. Those skilled in the art will understand that the internal air pressure exerts an axial expanding force on the tire that may be represented as a resultant force F acting on the rim flange 22, which is illustrated in FIG. 3. The rim flange 22 supplies an opposite force, which may be expressed as the sum of the stresses σ over the flange height H. Once the rim flange height H is determined from the above wheel geometry equation, the stress on the rim flange and the axially outward acting force generated by internal tire pressure may be related by the following equations:

$$F = \pi P\left(\left(\frac{D_{eq}}{2}\right)^2 - \left(\frac{D_b}{2}\right)^2\right)$$

where, $D_{eq}$ is the equilibrium diameter of the tire, $D_b$ is tire bead diameter, and P is the inflation pressure of the tire, and $$F \approx \sigma \pi D_b H$$

where, σ is the stress on the tire rim flange and H is the height of the rim flange as determined from the geometry equation, above.

These relationships are illustrated in FIG. 3.

To arrive at the appropriate relationship, the tire rim could be reinforced to provide greater stress resistance.

Alternatively, or in addition, the tire could be modified, for example, the internal pressure specification P for small vehicle tires could be lowered, or the tire equilibrium diameter could be changed by reducing the aspect ratio of the tire.

Using these tools, the tire designer can specify the geometry of a tire and wheel to obtain a tire and wheel in which the tire is mountable by hand on the wheel. The term "hand-mount" means that a person of average strength is able to work the tire bead over the rim flange without the assistance of tools.

The invention has been described in terms of preferred principles and embodiments, however, those skilled in the art will understand how to make substitution and use equivalents that will not depart from the scope of the invention as defined in the appended claims.

What is claimed is:

1. A wheel for a pneumatic, tubeless tire having a bead seat circumference $C_t$, comprising a rim having a flange of height H and width Y, a well having a depth G, a well floor diameter of $D_w$, a well floor circumference of $C_w$, and a well position W relative to the flange on a mounting side of the wheel, and wherein an additional length M has a value in a range of approximately 75 to 100 mm, the rim satisfying the relationship:

$$C_t = 0.5C_w + 2\sqrt{0.5D_w^2 + (0.5D_w + G + H)^2 + (W + Y)^2} + M$$

and wherein said tubeless tire is mountable on the wheel by hand without tools.

2. A pneumatic tire and wheel assembly, the tire being hand-mountable on the wheel without tools, comprising:
   a tire having a bead with a bead seat circumference of $C_t$, and,
   a wheel having a rim with a flange of height H and width Y, and a well having a depth G, a well floor diameter $D_w$, a well floor circumference $C_w$, and a well position W relative to the flange on a mounting side of the wheel, satisfying the relationship:

$$C_t = 0.5C_w + 2\sqrt{0.5D_w^2 + (0.5D_w + G + H)^2 + (W + Y)^2} + M$$

wherein, M has a value of at least 80 mm.

3. The assembly as claimed in claim 2, wherein M is not more than about 100 mm.

4. The assembly as claimed in claim 2, wherein the tire bead has an ovalization stiffness of not more than 0.7 N/mm.

* * * * *